No. 847,549. PATENTED MAR. 19, 1907.
J. A. BURNS.
COIL BENDER.
APPLICATION FILED JAN. 20, 1904.

5 SHEETS—SHEET 2.

WITNESSES: INVENTOR
James A. Burns
BY
ATTORNEY

No. 847,549. PATENTED MAR. 19, 1907.
J. A. BURNS.
COIL BENDER.
APPLICATION FILED JAN. 20, 1904.

5 SHEETS—SHEET 3.

WITNESSES:
F. H. Miller.
C. L. Belcher

INVENTOR
James A. Burns
BY
Wesley L. Carr
ATTORNEY

No. 847,549. PATENTED MAR. 19, 1907.
J. A. BURNS.
COIL BENDER.
APPLICATION FILED JAN. 20, 1904.

5 SHEETS—SHEET 4.

WITNESSES:
Fred A Miller
Birney Hines

INVENTOR
James A. Burns
BY
Wesley J. Carr
ATTORNEY

No. 847,549. PATENTED MAR. 19, 1907.
J. A. BURNS.
COIL BENDER.
APPLICATION FILED JAN. 20, 1904.

5 SHEETS—SHEET 5.

WITNESSES:
F. H. Miller
C. L. Belcher

INVENTOR
James A Burns
BY
Healey & Barr
ATTORNEY

UNITED STATES PATENT OFFICE.

JAMES A. BURNS, OF HOMESTEAD, PENNSYLVANIA, ASSIGNOR TO WESTINGHOUSE ELECTRIC & MANUFACTURING COMPANY, A CORPORATION OF PENNSYLVANIA.

COIL-BENDER.

No. 847,549.      Specification of Letters Patent.      Patented March 19, 1907.

Application filed January 20, 1904. Serial No. 189,866.

*To all whom it may concern:*

Be it known that I, JAMES A. BURNS, a citizen of the United States, and a resident of Homestead, in the county of Allegheny and State of Pennsylvania, have invented a new and useful Improvement in Coil-Benders, of which the following is a specification.

My invention relates to machines for forming coils for electrical apparatus; and it has for its object to provide a machine which may be utilized for bending an easily-wound coil of simple preliminary form into a more complex form suitable for application to a core to constitute an element of a symmetrical distributed winding.

Figure 1:
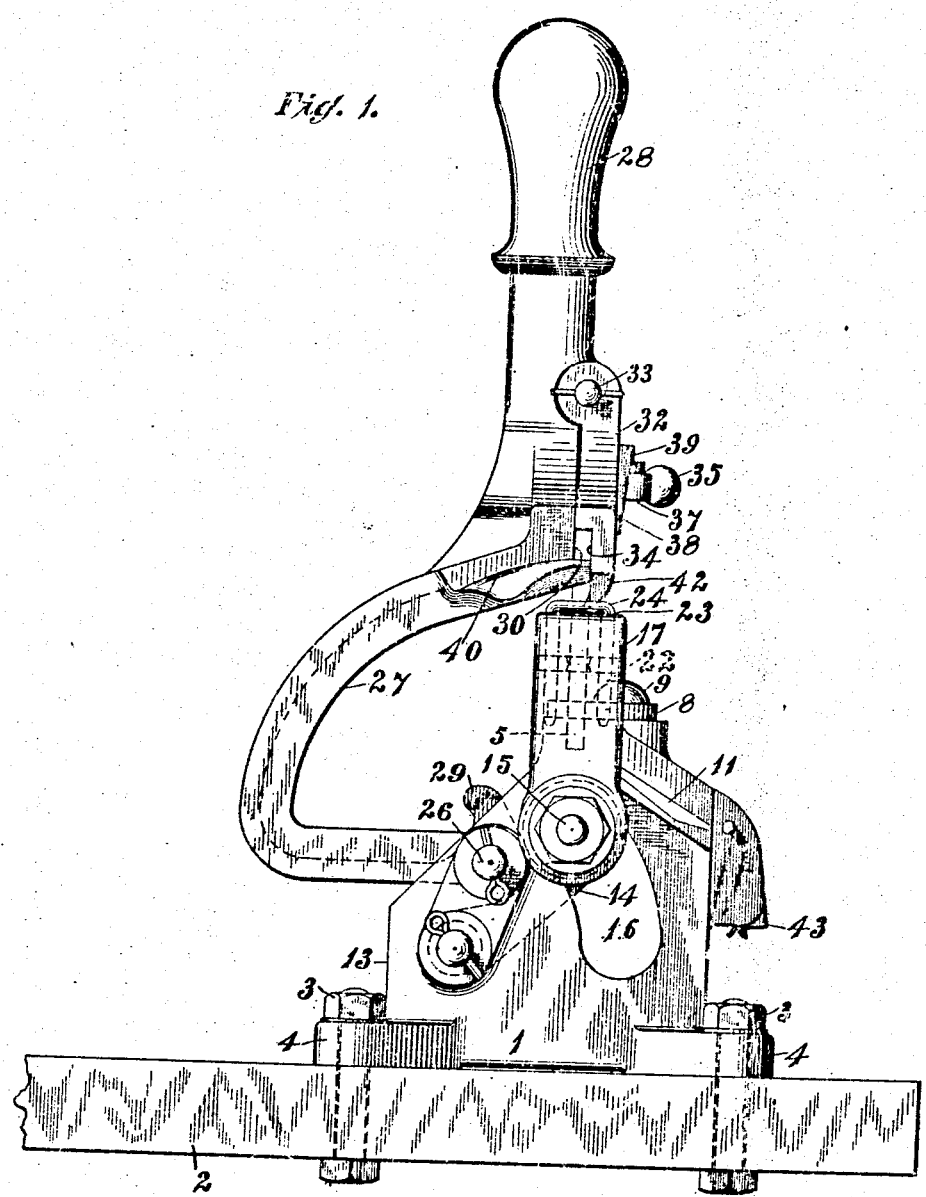
Figure 2:
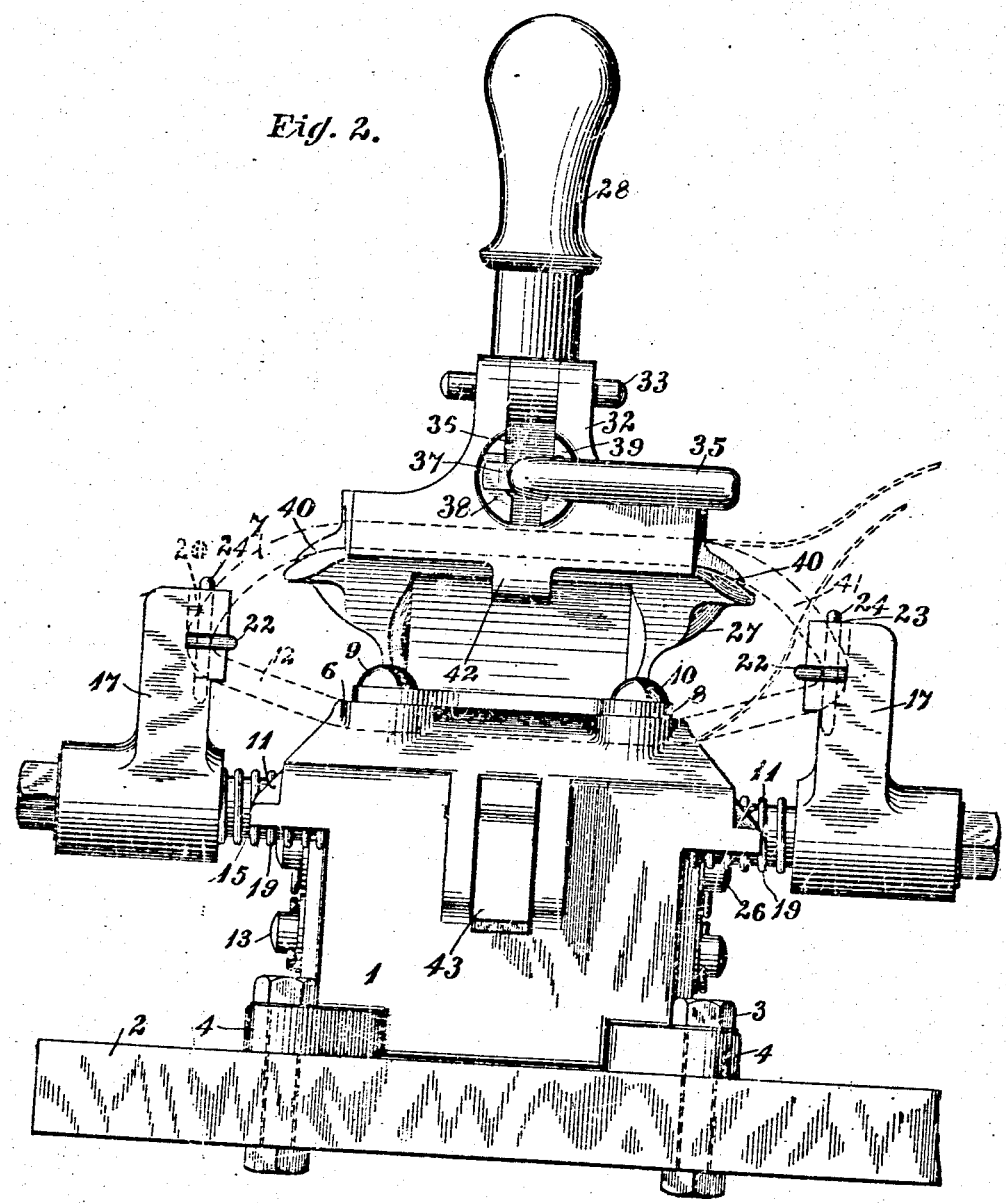
Figure 3:
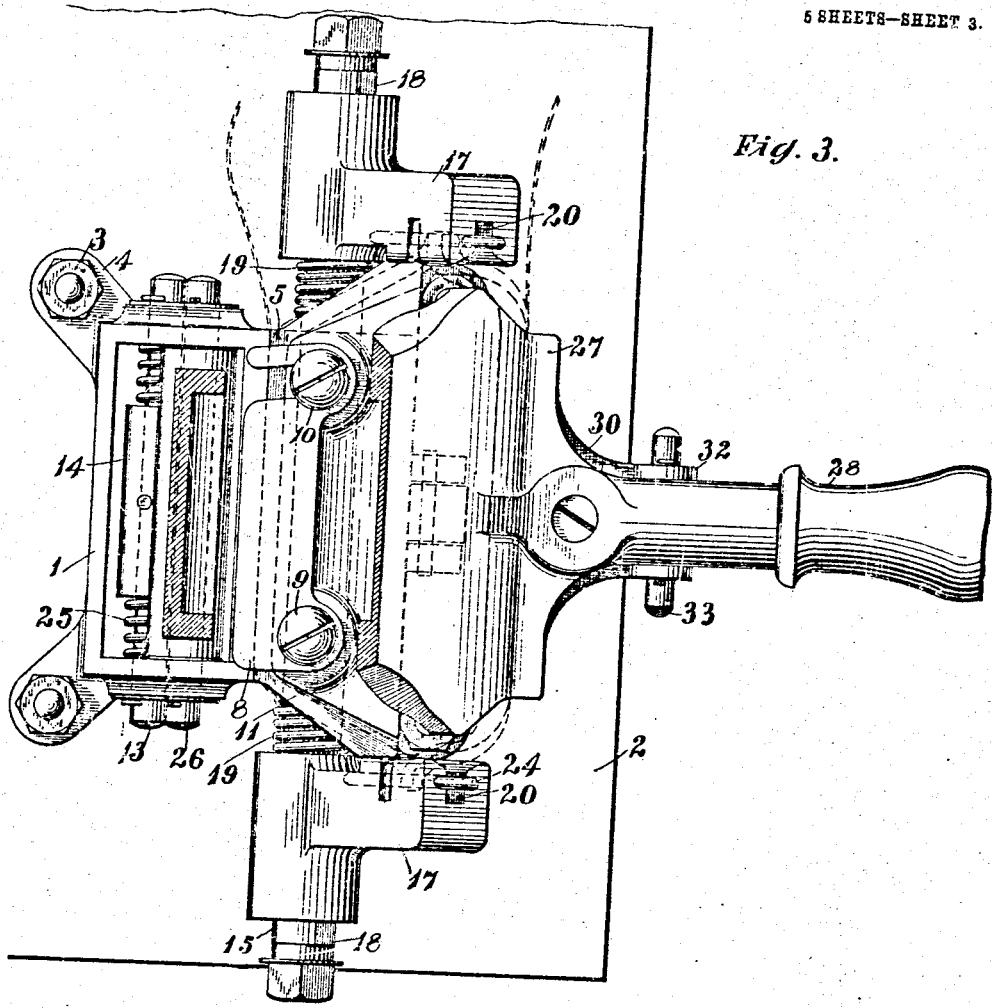
Figure 4:
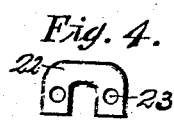
Figure 5:
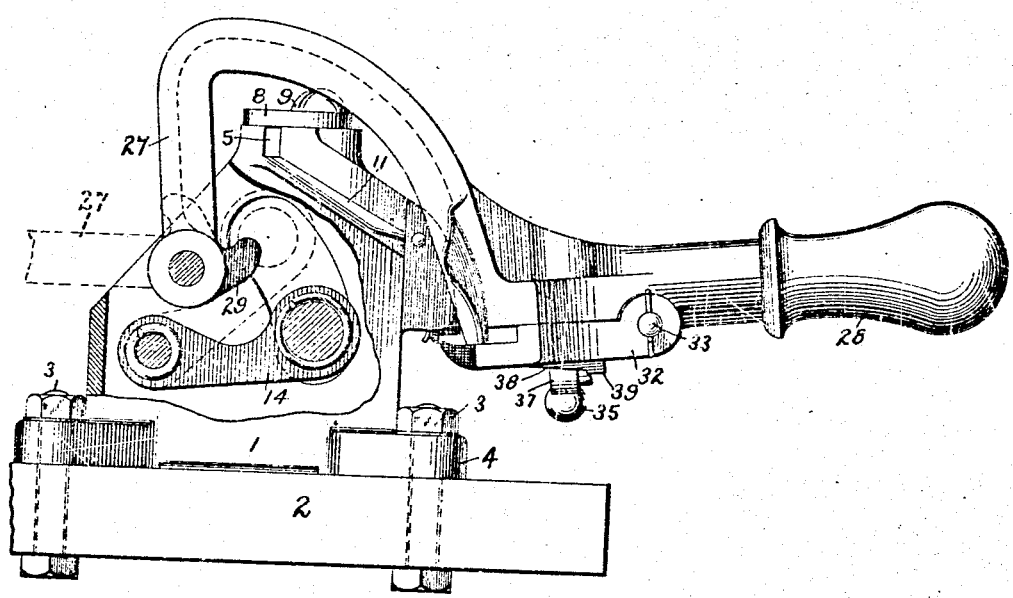
Figure 6:
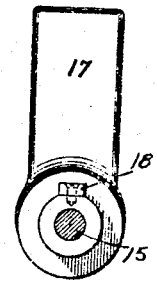
Figure 7:
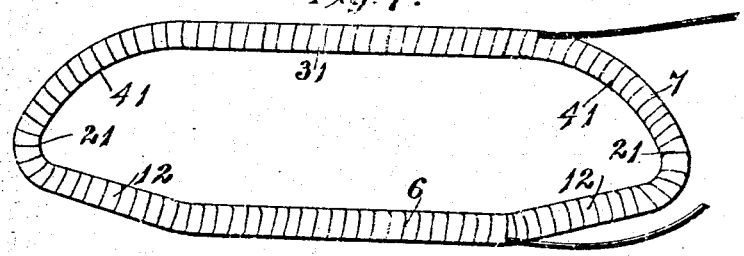
Figure 8:
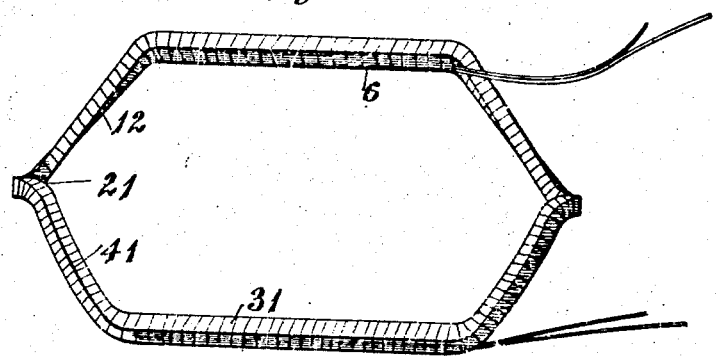
Figure 9:
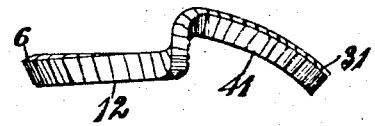

In the accompanying drawings, Figure 1 is a view in side elevation, and Fig. 2 a view in front elevation, of a machine constructed in accordance with my invention and shown in open position. Fig. 3 is a plan view of the machine in its closed position, a portion of one of the parts being broken away. Fig. 4 is a detail view of one of the parts. Fig. 5 is a view, partially in side elevation and partially in section, of the machine shown in the preceding figures; and Fig. 6 is a detail view of one of the members of the machine. Fig. 7 is a plan view of a preliminary coil; Fig. 8, a plan view of a completed coil, and Fig. 9 an end view of the coil shown in Fig. 8.

In the construction of armature-coils having a comparatively large number of turns of wire disposed in a plurality of layers each comprising one or more turns it has heretofore been the usual practice to make each coil in several sections of the correct and final form, each of which comprises a plurality of turns of the conductor with but a single turn per layer, the several sections being afterward properly assembled and connected. The winding and forming of each of these sections must be done separately, requiring skilled labor and expensive special molds to perform the operations, and the production of the complete coil involves an extra manual operation of assembling and properly connecting the two or more separately-formed sections.

In the use of my invention a simple flat coil comprising the total number of turns to be employed in the complete armature-coil is first wound into the proper preliminary form and is then placed in the machine and quickly given a final shape, such that the coils may be successively and expeditiously applied to the core without further bending. The preliminary form of coil may be wound in approximately the same length of time as that required for winding a single section according to the old method, and the bending of the preliminary form into the final form of coil by means of my invention involves the expenditure of much less time and labor than was involved in assembling and connecting the sections under the former practice. It follows, therefore, that the cost of a distributed winding may be materially reduced by the employment of a machine embodying my invention.

The base 1 of the machine may be secured to a suitable bench or table 2 by any suitable means, such as bolts 3 and lugs 4. The upper side of the base is provided with a rectangular longitudinal recess 5 for the reception of one of the straight sides 6 of a coil 7, or, in other words, one of the sides of the coil which is to be placed in a core-slot. Any suitable means may be employed for retaining the coil in position in the recess 5, that which I have devised comprising a plate 8, pivoted at one end to the base 1 on a screw 9 and adapted at its other end to engage with a screw-pin 10.

Adjoining the recess 5 at its ends and sloping toward the front of the machine are ledges 11, adapted to give the short portions 12 of the ends of the coil the proper form.

Hinged to the base 1 on a rod 13 is a movable member 14, carrying at its free end a longitudinal shaft 15, the ends of which project through apertures 16 in the sides of the base and are provided with arms 17, which are longitudinally movable thereon and which are held from rotative movement thereon by means of keys 18. The arms 17 are normally retained at the extremities of the shaft 15 by means of helical springs 19. In the free ends of the arms 17 are recesses 20, provided for the reception of the end projections 21 of the coil 7, the means for retaining said portions of the coil in the recesses comprising U-shaped plates 22, which surround the said portions and have holes 23 for the reception of staples 24, that are seated in the ends of the arms 17, substantially as shown. The member 14 is normally supported in its uppermost position by means of a helical spring 25.

A second movable member 27 is pivoted to the base 1 by means of a rod 26 and is provided at its free end with an operating-handle 28 and at its other end with a cam 29, which engages the member 14 and moves it simultaneously with the said second member. Near the free end of the member 27 is a longitudinal face 30, adapted to receive the other straight side 31 of the coil 7, which is retained in position by means of a plate 32, pivoted on a rod 33, having at its free end a reversely-disposed face 34 opposite the face 30, substantially as shown.

Means for clamping the coil between the faces 30 and 34 comprise a lever 35, pivotally attached to the member 27 and protruding through an aperture 36 in the plate 32, said lever being provided with a lug 37, which engages the inclined surface 38 of a boss 39.

Adjoining the ends of the straight face 30 are curved ledges 40, which slope backward slightly when the machine is open and upward when the machine is closed and which are adapted to give the proper form to the portions 41 of the ends of the coil 7.

A tongue 42 on the plate 32 is adapted to engage with a spring-latch 43 on the front of the base 1 when the member 27 is in its lowermost position and the lever 35 is in the position shown in Fig. 2. The object of this arrangement is to prevent the raising of the member 27 while a coil is still clamped in position, it being necessary to first release the side 31 of the coil by turning the lever 35 before raising the member 27.

The coil 7 having a preliminary form similar to that shown in Fig. 5 and comprising the total number of turns to be employed in the complete armature-coil is placed in the machine with the straight side 6 in the recess 5 and the other straight side 31 on the face 30, and the retaining devices are adjusted substantially as shown in Figs. 1 and 2.

The points 21 of the coils are placed in the recesses 20 in the arms 17 and the pieces 22 and 24 put in position. The member 27 is closed upon the base 1 until the tongue 42 engages the ends of the spring-latch 43, and the ends of the coil may then be hammered slightly with a mallet in order to make the various portions of the ends of the coil conform closely to the shapes of the ledge-faces. When removed from the machine, the coil is in final form to be placed in the slots of the core in connection with which it is to be used.

While I have referred to my invention as adapted for use in making armature-coils, it is to be understood that the coils so made may be used in any relations for which they may be suitable and that the form and dimensions of the machine and its several parts may be varied from what is shown within comparatively wide limits without departing from my invention.

I claim as my invention—

1. A machine for bending wire coils comprising a base provided with means for retaining one side of a coil, a member hinged to said base and provided with means for retaining the other side of said coil, and arms hinged to said base and provided with means for retaining the ends of said coil.

2. A machine for bending wire coils comprising a base provided with means for retaining one side of a coil and with ledge-faces for shaping portions of the ends of said coil, a member hinged to said base and provided with means for retaining the other side of said coil and with faces for shaping other portions of the ends of said coil, and arms hinged to said base and provided with means for retaining and forming the remaining portions of the ends of said coil.

3. In a machine for bending wire coils, a base having a recessed portion for the reception of one side of a coil, in combination with a movable member for gripping the other side of the coil and bending it into a different position with reference to the first side, and a movable member for gripping the ends of the coil.

4. In a machine for bending wire coils, a base having a recessed portion for the reception of one side of a coil and ledges adjoining the said recess at both ends thereof, in combination with a hinged member for gripping and bending the other side of the coil.

5. In a machine for bending wire coils, a base having a recess for the reception of one side of a coil, in combination with hinged members for gripping the other side and the ends of the coil independently of the base and bending them to the desired form.

6. In a machine for bending wire coils, a base having a recess for the reception of one side of a coil and means for retaining the coil in said recess, in combination with a movable member for gripping and bending the other side of the coil, and a movable member for gripping the ends of the coil.

7. In a coil-bending machine, the combination with a base having a recess for one side of a coil, of a member hinged thereto and having a ledge-face and means for gripping the other side of the coil.

8. In a coil-bending machine, the combination with a base having a recess and ledges branching from the ends thereof, of a member hinged to said base and having a ledge-face and ledges adjoining the aforesaid face at the ends thereof.

9. The combination with a base, of a member hinged thereto having a ledge-face parallel to the axis of the member, and a plate hinged to said member, said plate having a ledge-face adapted, in conjunction with the aforesaid face, to form an aperture.

10. The combination with a base, of a member hinged thereto having a ledge-face parallel to the axis of the member, a plate pivoted to said member and adapted, in conjunction with the aforesaid face, to form an aperture, and means for clamping the plate to the hinged member.

11. In a coil-bending machine, the combination with a base having a coil-holding recess, of a member hinged to said base and having coil-gripping means and means for supporting the free end of said member normally in its uppermost position.

12. The combination with a base, of a member hinged thereto, means for supporting the free end of said member normally in its uppermost position, and a feathered shaft secured to the free end of said member and longitudinally-movable arms thereon provided with recesses at the free ends thereof.

13. The combination with a base, of a member hinged thereto, means for supporting the free end of said member normally in its uppermost position, and a feathered shaft secured to the free end of said member and longitudinally-movable arms thereon.

14. The combination with a base, of a member hinged thereto, means for supporting the free end of said member normally in its uppermost position, a feathered shaft secured to the free end of said member, longitudinally-movable arms thereon provided with recesses at the free ends thereof for the reception of the ends of a coil and means for securing the ends of the coil in said recesses.

15. The combination with a base, of a member hinged thereto, means for supporting the free end of said member normally in its uppermost position, a feathered shaft secured to the free end of said member, longitudinally-movable arms thereon provided with recesses at the free ends thereof, and resilient means for normally retaining said arms at the extremities of the said shaft.

16. In a machine for bending wire coils, a base having a recess for one side of a coil and a member hinged to said base and provided with means for gripping the ends of the coil independently of the base.

17. In a coil-bending machine, the combination with a base having a recess for one side of a coil, a coil-gripping member hinged to said base and a spring for normally supporting the said member in its uppermost position, of a second member hinged to said base which is provided with means for moving the said first-named member against the action of said spring.

18. In a coil-bending machine, the combination with a base having a recess for one side of a coil and a coil-gripping member hinged to said base, of a second member hinged to said base and having a projecting arm at its hinged end which engages with said first member so that the two members are moved simultaneously.

19. The combination with a base provided with means for retaining one side of a coil, and a member hinged to said base provided with means for retaining the other side of said coil, of means for locking the free end of said member to said base when in its closed position until the coil is released from said hinged member.

20. In a coil-bending machine, the combination with a base having a recess for one side of a coil and ledges to receive adjacent end portions, of a member hinged to the base and having recessed arms to receive the ends of the coil and a second hinged member having a recess for the other side of the coil and ledges to receive the adjacent end portions and having also means for engaging the first hinged member to move it to its closed position.

21. A coil-bending machine comprising a base and a hinged member for respectively gripping the opposite sides of a coil and a second hinged member for gripping the ends of the coil.

22. A coil-bending machine comprising a base having a forming-surface for approximately one half of a coil, a hinged member having a forming-surface for approximately the other half of the coil and a second hinged member having recesses to form offset bends between the two halves of the coil.

23. A coil-bending machine comprising a base having a recess and surfaces to receive approximately one half of a coil, a hinged member having a recess and surfaces for approximately the other half of the coil and a second hinged member having recesses to form offset bends in the ends of the coil.

24. In a coil-bending machine, the combination with a base having a recess and means for locking one side of a coil therein, of a hinged member having a recess and means for locking the other side of the coil therein and a second hinged member having arms provided with recesses and means for locking the ends of the coil therein.

25. In a coil-bending machine, the combination with a base having a recess, means for locking one side of a coil therein and ledges to receive the adjacent end portions of the coil, of a hinged member having a recess, means for locking the other side of the coil therein and ledges to receive the adjacent end portions of the coil and a second hinged member having arms provided with recesses and means for locking the ends of the coil therein in order to form offset bends.

In testimony whereof I have hereunto subscribed my name this 15th day of January, 1904.

JAMES A. BURNS.

Witnesses:
OTTO S. SCHAIRER,
BIRNEY HINES.